(12) United States Patent
Zachey

(10) Patent No.: US 9,479,335 B2
(45) Date of Patent: Oct. 25, 2016

(54) ENCRYPTED MASS-STORAGE DEVICE WITH SELF RUNNING APPLICATION

(71) Applicant: Paul Michael Zachey, San Diego, CA (US)

(72) Inventor: Paul Michael Zachey, San Diego, CA (US)

( * ) Notice: Subject to any disclaimer, the term of this patent is extended or adjusted under 35 U.S.C. 154(b) by 0 days.

(21) Appl. No.: 14/596,829

(22) Filed: Jan. 14, 2015

(65) Prior Publication Data

US 2016/0204940 A1   Jul. 14, 2016

(51) Int. Cl.
*H04L 9/32* (2006.01)
*G06F 21/57* (2013.01)
*H04L 9/34* (2006.01)

(52) U.S. Cl.
CPC ........... *H04L 9/3226* (2013.01); *G06F 21/575* (2013.01); *H04L 9/3231* (2013.01); *H04L 9/3242* (2013.01); *H04L 9/34* (2013.01)

(58) Field of Classification Search
CPC ..................................................... H04L 9/3226
USPC ......................................................... 713/193
See application file for complete search history.

(56) References Cited

U.S. PATENT DOCUMENTS

| 7,945,788 B2 | 5/2011 | Roberts et al. |
| 8,868,898 B1* | 10/2014 | Van Hoof ............. G06F 21/575 |
| | | 710/200 |
| 2007/0214369 A1 | 9/2007 | Roberts et al. |
| 2011/0208977 A1 | 8/2011 | Roberts et al. |
| 2012/0331304 A1* | 12/2012 | She ......................... G06F 21/85 |
| | | 713/189 |

* cited by examiner

*Primary Examiner* — Jacob Lipman

(57) ABSTRACT

An encrypted mass-storage drive device with self-running application is disclosed. The encrypted mass-storage drive device allows storage of vital documents and files to a person who is able to access the vital documents and files safely and securely. The encrypted mass-storage drive device authenticates user credentials of the person and prevents unauthorized tampering with the device. In some embodiments, the encrypted mass-storage drive device destroys the data contents stored on the drive when the encrypted mass-storage drive device detects a threshold number of unauthorized access attempts. In some embodiments, the encrypted mass-storage drive device is an encrypted USB mass-storage device.

9 Claims, 4 Drawing Sheets

ENCRYPTED MASS-STORAGE DEVICE WITH SELF RUNNING APPLICATION

BACKGROUND

Embodiments of the invention described in this specification relate generally to encrypted data processes, and more particularly, to secure encrypted mass-storage device drives with self-running applications.

Existing mass-storage devices, such as USB, Thunderbolt, Firewall device drives, etc., which include drive launcher applications typically allow for only one password to unlock a hardware-encrypted mass-storage-device. This password doubles as the encryption cypher for on-drive encryption. This is a problem for many people who need high security for vital documents that may be installed on the mass-storage device.

Mass-storage device drives (e.g., USB, etc.) typically store data but do not provide any combination of self-running applications and encryption security. This is a problem for people, companies, organizations, and other entities who need the ability to safely and securely run applications with data encryption and authentication while preventing host computer system processes from adulterating the encrypted data or access information without proper authorization. In some situations, people need the ability to carry vital documents in a portable disk drive, such as a USB drive, and be able to access the vital documents at any time and in any location. This is increasingly difficult given that so much data is derived from proprietary software applications which run on host computer systems.

Therefore, what is needed is a way to assist anyone whom makes full use of the product to be able to put their life back in order almost in every circumstance if the need arises.

BRIEF DESCRIPTION

Some embodiments of the invention include a novel encrypted mass-storage device with a self-running application that allows a user of the encrypted mass-storage device to access vital life documents from one or more drive partitions of the device on any host computer system via the self-running application. In some embodiments, the encrypted mass-storage device is an encrypted universal serial bus (USB) mass-storage device with one or more encrypted drive partitions. In some embodiments, the encrypted USB mass-storage device (i) provides user registration, (ii) allows for email-password authentication, (iii) allows for an optional two-factor authentication, (iv) uses computer hardware fingerprints for device authentication, (v) provides a recovery platform in the event of lost credentials, and (vi) provides the end-user with statistics of drive usage.

In some embodiments, the encrypted USB mass-storage device includes a launcher application that runs when the encrypted USB mass-storage device is connected to a host computer system. In some embodiments, the launcher application of the encrypted USB mass-storage device includes an authenticator program that uses a two-factor cryptographically secure authentication process to authenticate a user of the encrypted USB mass-storage device and unlock at least one hardware-encrypted drive partition with both a username and a password. By using the cryptographically secure authentication process, the encrypted USB mass-storage device provides for a secure-encrypted cloud platform that syncs with encrypted the USB mass-storage device at a hardware level.

In some embodiments, the encrypted mass-storage device includes a self-running operating system that runs when the encrypted mass-storage device is connected to a host computer system. In some embodiments, the self-running operating system is stored on a software-bearing partition of the encrypted USB mass-storage device and loaded into random access memory (RAM) of the host computer system during a power-up cycle of the host computer system. In some embodiments, the self-running operating system directly accesses a kernel layer of the host computer system to access a set of hardware devices of the host computer system. The host computer system can have any type of operating system (OS), such as Windows, MAC, Linux, and the kernel interface to the underlying hardware of the host computer system will be accessed directly from the self-running operating system of the encrypted USB mass-storage device.

In some embodiments, the encrypted mass-storage device is an encrypted Firewire mass-storage device. In some embodiments, the encrypted mass-storage device is an encrypted Thunderbolt mass-storage device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include an encrypted mass-storage device with a self-running application that allows a user of the encrypted mass-storage device to access vital life documents from one or more drive partitions of the device on any host computer system via the self-running application. In some embodiments, the encrypted mass-storage device is an encrypted universal serial bus (USB) mass-storage device with one or more encrypted drive partitions. In some embodiments, the encrypted USB mass-storage device (i) provides user registration, (ii) allows for email-password authentication, (iii) allows for an optional two-factor authentication, (iv) uses computer hardware fingerprints for device authentication, (v) provides a recovery platform in the event of lost credentials, and (vi) provides the end-user with statistics of drive usage.

Figure 1:
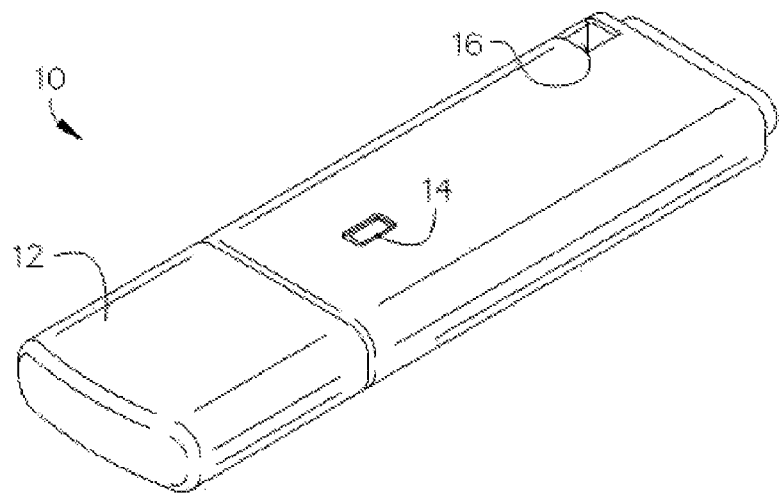
FIG. 1 conceptually illustrates a perspective view of an encrypted USB mass-storage device in some embodiments with a self-running application.

By way of example, FIG. 1 conceptually illustrates a perspective view of an encrypted USB mass-storage device 10 with a self-running application that allows a user of the USB device to access vital life documents from the device. The encrypted USB mass-storage device 10 shown in this figure is a mass-storage device capable of encrypting and storing digital documents and files. Examples of digital documents and files include text and rich text documents, images, video clips, audio recordings, programs, etc. Encryption of the digital documents and files is based on government-grade encryption standards, such as FIPS 140-2. In some cases, the USB mass-storage device 10 is encrypted under FIPS 140-2 as a whole, thereby cryptographically securing any and all data stored on the USB mass-storage device.

As a mass-storage device, the encrypted USB mass-storage device 10 can store many digital documents and files. Examples of digital documents and files that a person might securely store include wills, deeds, contracts, birth certificates, taxes, and other vital documents the person would need to access in the event of any unforeseen loss or destruction of physical documents associated with the digital documents and files. Similarly, government organizations and companies may use the encrypted USB mass-storage device 10 to secure access to files and documents that require a particular minimum clearance level to access. The encrypted USB mass-storage device can be produced with an authenticator program that uses any type of encryption scheme, but by way of example, the encrypted USB mass-storage device 10 can support Levels 1-4 of FIPS 140-2 encryption scheme. This allows for tiered permission-based access the constrains access to file system contents stored on the encrypted USB mass-storage device 10. Furthermore, the size of the encrypted USB mass-storage device may be bounded at any of several size limitations, with size limitations of the USB encrypted drive 10 based on the need of the end user. Examples of the sizes of the encrypted USB mass-storage device 10 include 32 GB, 64 GB, 128 GB, 256 GB, 512 GB, 1 TB, 2, TB, 4 TB, etc. Individual partition drives of the encrypted USB mass-storage device 10 may vary also. For instance, an overall 64 GB size of the encrypted USB mass-storage device 10 may include two drives partitioned at 32 GB each, or three drives partitioned at 32 GB, 16 GB, and 16 GB, or any other such combination of drive partitions that make up the overall size of the encrypted USB mass-storage device 10.

The encrypted USB mass-storage device 10 shown in this figure includes a drive cap 12, a light 14, and a key ring/string hole 16. The drive cap 12, light 14, and key ring/string hole 16 are optional features of the encrypted USB mass-storage device 10. In some cases, other optional features can be provided. For example, the color of the exterior case of the encrypted USB mass-storage device 10 can be green, blue, red, gray, black, white, or any other such color. The optional features are not required for the encrypted USB mass-storage device 10 to operate when connected to a host computer system, but may enhance the aesthetic appearance and/or ability to retain the encrypted USB mass-storage device 10.

Figure 2:
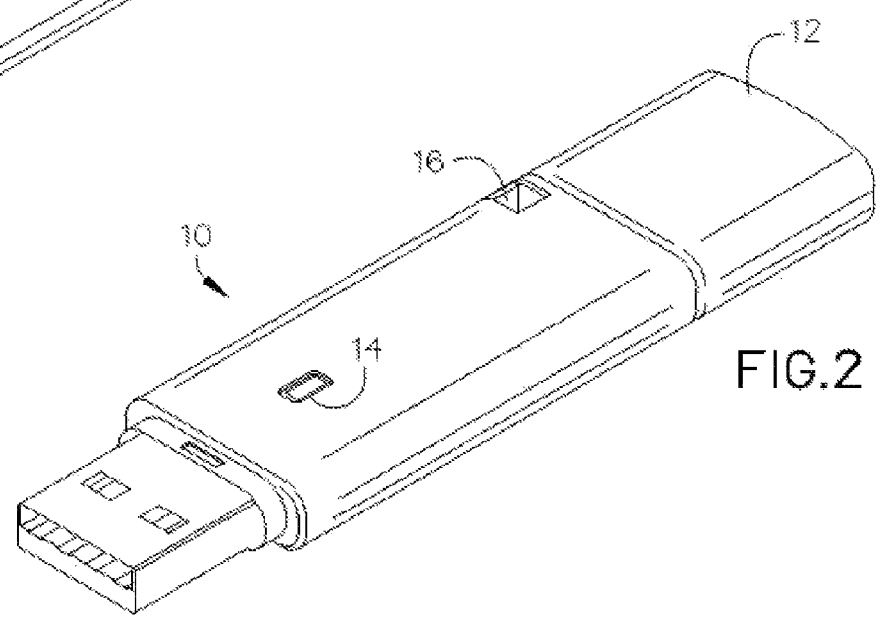
FIG. 2 conceptually illustrates another perspective view of the encrypted USB mass-storage device in some embodiments with the cap of the USB device relocated to the rear of the device.

By way of example, FIG. 2 conceptually illustrates another perspective view of the encrypted USB mass-storage device 10 with the cap of the drive relocated to the rear of the drive 10. In this figure, the drive cap 12 is placed to the rear in order to expose the USB connector interface that allows the USB encrypted drive 10 to connect to the host computer system.

In some embodiments, the encrypted USB mass-storage device includes a launcher application that runs when the encrypted USB mass-storage device is connected to a host computer system. In some embodiments, the launcher application of the encrypted USB mass-storage device includes an authenticator program that uses a two-factor cryptographically secure authentication process to authenticate a user of the encrypted USB mass-storage device and unlock at least one hardware-encrypted drive partition with both a username and a password. By using the cryptographically secure authentication process, the encrypted USB mass-storage device provides for a secure-encrypted cloud platform that syncs with encrypted the USB mass-storage device at a hardware level.

In some embodiments, the encrypted USB mass-storage device includes a fingerprint pad that is able to receive a thumbprint or fingerprint of a user attempting to access the contents of the encrypted USB mass-storage device 10. In some embodiments, the fingerprint or thumbprint of the user, when placed on the fingerprint pad and received by the encrypted USB mass-storage device, is used as an identifier to unlock the hardware-based encryption. For instance, instead of entering a username, the user may simply provide a fingerprint or thumbprint to the authentication process.

Figure 3:
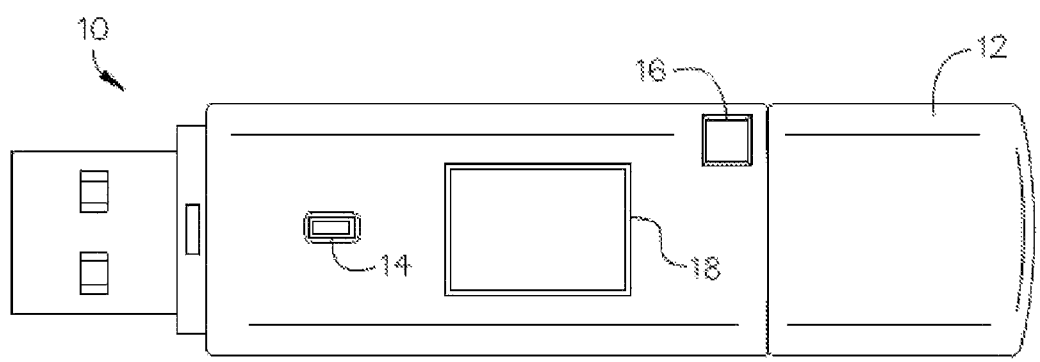
FIG. 3 conceptually illustrates a top perspective view of the encrypted USB mass-storage device in some embodiments.

By way of example, FIG. 3 conceptually illustrates a top perspective view of the encrypted USB mass-storage device 10. In this figure, the encrypted USB mass-storage device 10 includes a fingerprint pad 18, along with the drive cap 12 (covering the back of the encrypted USB mass-storage device 10), the light 14, and the key ring/string hole 16. When the encrypted USB mass-storage device 10 is connected to a host computer system, the authenticator program may be started by the launcher application of the encrypted USB mass-storage device 10. The authenticator program may wait for a fingerprint or thumbprint of the user before starting the authentication, or in some cases, may use the received fingerprint or thumbprint as a "username" in a two-factor authentication scheme. This allows a greater level of security to the contents stored on the encrypted USB mass-storage device 10 due to the uniqueness of the user's fingerprint or thumbprint.

Embodiments of the encrypted mass-storage device described in this specification differ from and improve upon currently existing mass-storage devices. In particular, some embodiments of the encrypted mass-storage device differ because it includes a self-running application that allows a user to securely access vital documents on any host computer system without needing to use the host computer system operating system. In some embodiments, the encryption prevents unauthorized access to the contents of the encrypted drive, thereby ensuring no unauthorized access to vital documents occurs. Also, in some embodiments the encrypted mass-storage device will automatically erase the contents stored on the encrypted USB mass-storage device after repeated tampering attempts by unauthorized entities. In addition, some embodiments of the encrypted mass-storage device improve upon the currently existing mass-storage devices by assisting anyone whom makes full use of the encrypted mass-storage device to be able to put their life back in order almost in every circumstance if the need arises.

The encrypted mass-storage device with self-running application of the present disclosure may be comprised of the following elements. This list of possible constituent elements is intended to be exemplary only and it is not intended that this list be used to limit the encrypted mass-storage device with self-running application of the present application to just these elements. Persons having ordinary skill in the art relevant to the present disclosure may understand there to be equivalent elements that may be substituted within the present disclosure without changing the essential function or operation of the encrypted mass-storage device with self-running application.

1. Mass storage disk
2. Mass storage access and operation hardware modules
3. Unique mass-storage device hardware serial number
4. Independent running software application(s)
5. Independent (non-host computer system) operating system (e.g., MAC, Windows, Linux, and other operating system (OS) platforms)
6. Encryption, authentication, and antivirus software The encrypted USB mass-storage device with self-running application of the present disclosure generally works by independently operating from a USB port of a host computer system. In some embodiments, the encrypted mass-storage device includes a self-running operating system that runs when the encrypted mass-storage device is connected to a host computer system. In some embodiments, the self-running operating system is stored on a software-bearing partition of the encrypted USB mass-storage device and loaded into random access memory (RAM) of the host computer system during a power-up cycle of the host computer system. In some embodiments, the self-running operating system directly accesses a kernel layer of the host computer system to access a set of hardware devices of the host computer system. Examples of hardware devices of a host computer system include media drives (hard disk drive, CD drive, DVD drive, Blu-ray drive, etc.), display monitor, touch sensitive display screen, keyboard, audio speaker, NIC, BIOS or BIOS Tables, Embedded ROM Extensions, microphone, mouse, trackpad, other such pointing device, etc. The host computer system can have any type of operating system (OS), such as Windows, MAC, Linux, and the kernel interface to the underlying hardware of the host computer system will be accessed directly from the self-running operating system of the encrypted USB mass-storage device.

In some embodiments, the encrypted USB mass-storage device includes an authentication mechanism to ensure that unauthorized access to the contents of the drive is prevented. In some embodiments, the authentication mechanism includes two separate parts. The first part, in some embodiments of the encrypted USB mass-storage device, is provided via the hardware of the USB device itself, thereby being a hardware-encrypted mass-storage-device. This is achieved by the fact that each encrypted mass-storage device has a secret, unique, read only serial number assigned to the device during the manufacturing process. In some embodiments, the encrypted USB mass-storage device launcher application uses this secret serial number along with a series of algorithms to generate a cryptographically secure password inside the self-running application.

The second part of the authentication mechanism is a server side authentication procedure. Specifically, each end user of an encrypted USB mass-storage device registers with his/her own email address and password. In some embodiments, the first user to 'claim' an encrypted USB mass-storage device is considered the initial administrator of the device. Administrators of an encrypted USB mass-storage device may grant permissions to other individual users. These permissions include drive-wide read-only permissions per user and full access per user. For example, using FIPS (Federal Information Processing Standard) 140-2 encryption, an administrator of the encrypted USB mass-storage device can grant one of the four Levels of access to each individual user. Each user account is authenticated via salted hashes. No passwords are sent in plain text anywhere in this application or over a network. Once authenticated, the contents of the drive are available to the end user. The level of access is dependent upon the user's permissions.

To use the encrypted USB mass-storage device with self-running application of the present disclosure, a person would identify a set of vital documents to store on the encrypted USB mass-storage device, transfer the vital document files to the encrypted USB mass-storage device, set up password and authenticated access rights for the encrypted USB mass-storage device, and then access the vital documents directly from the self-running application on the encrypted USB mass-storage device when the vital documents are needed, such as during an emergency. The application would contain the same materials except it would run on the host computer system.

Figure 4:
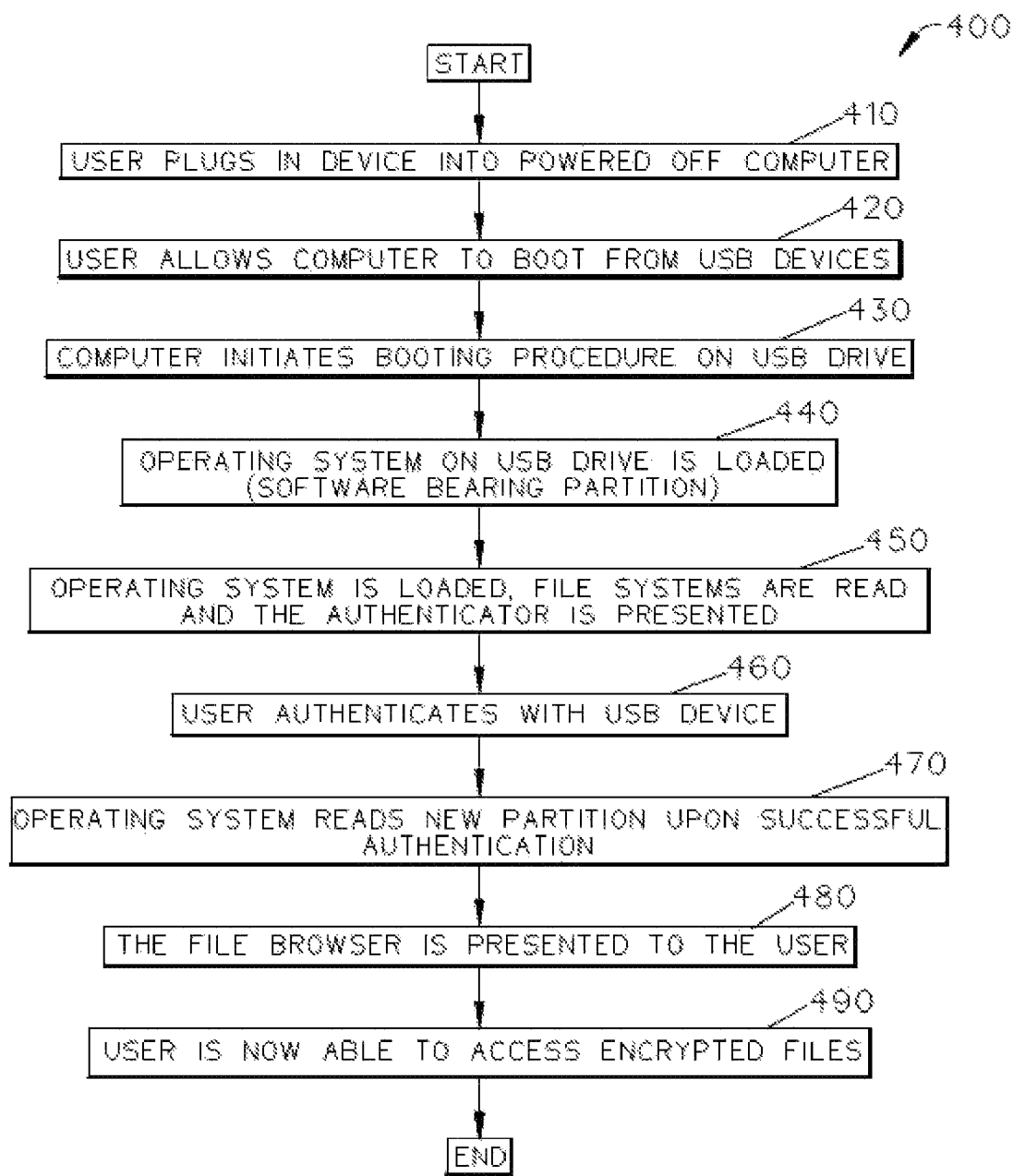
FIG. 4 conceptually illustrates a process for accessing a set of encrypted data content stored on a partition of the encrypted USB mass-storage device in some embodiments.

By way of example, FIG. 4 conceptually illustrates a process 400 for accessing data with a self-running application on a encrypted USB mass-storage device. As shown in this figure, the process 400 starts when a user connects (at 410) the encrypted USB mass-storage device to a host computer system. For instance, the user may plug the encrypted USB mass-storage device into a female USB port of the host computer system. The host computer system may be powered off and accessed upon powering up the host computer system. The user allows (at 420) the host computer system to power up in order to boot from the encrypted USB mass-storage device during the power-up cycle. The host computer system then initiates (at 430) a booting procedure on the encrypted USB mass-storage device.

Next, the process 400 in some embodiments loads (at 440) the self-running operating system from the encrypted USB mass-storage device. In some embodiments, the self-running operating system is loaded from a software-bearing partition of the encrypted USB mass-storage device. Once the operating system is loaded, the process 400 then reads one or more file systems of the encrypted USB mass-storage device and presents authentication prompts (at 450) so that a user of the encrypted USB mass-storage device can log in and access the contents of the encrypted USB mass-storage device. The process 400 then receives (at 460) the user's authentication data. For example, the user may provide a username and a password to the encrypted USB mass-storage device, or the user may provide a username and a thumbprint to the encrypted USB mass-storage device, depending on the requirements of the authenticator program running.

If the authentication is successful, the process 400 transitions to 470 at which point the self-running operating system of the encrypted USB mass-storage device reads a new partition of the encrypted USB mass-storage device. The process 400 next presents (at 480) a file browser for the new partition to the user. The user is then able to access (at 490) the encrypted files and documents of the encrypted USB mass-storage device. The process 400 then ends.

To make the encrypted USB mass-storage device with self-running application of the present disclosure, a special grade encrypted USB mass-storage device would need to be developed and an application that runs independently on a 64-bit or greater host computer system (e.g., WINDOWS, MAC, Linux, etc.). A self-running operating system would be installed on a partition of the encrypted USB mass-storage device. Additionally, in some embodiments of the encrypted USB mass-storage device, a set of host computer system hardware drivers would be accessed by the self-running operating system on the encrypted USB mass-storage device to use host computer system resources provided by a set of hardware devices of the host computer system. Examples of hardware devices of a host computer system include media drives (hard disk drive, CD drive, DVD drive, Blu-ray drive, etc.), display monitor, touch sensitive display screen, keyboard, audio speaker, NIC, BIOS or BIOS Tables, microphone, mouse, trackpad, other such pointing device, etc.

Figure 5:
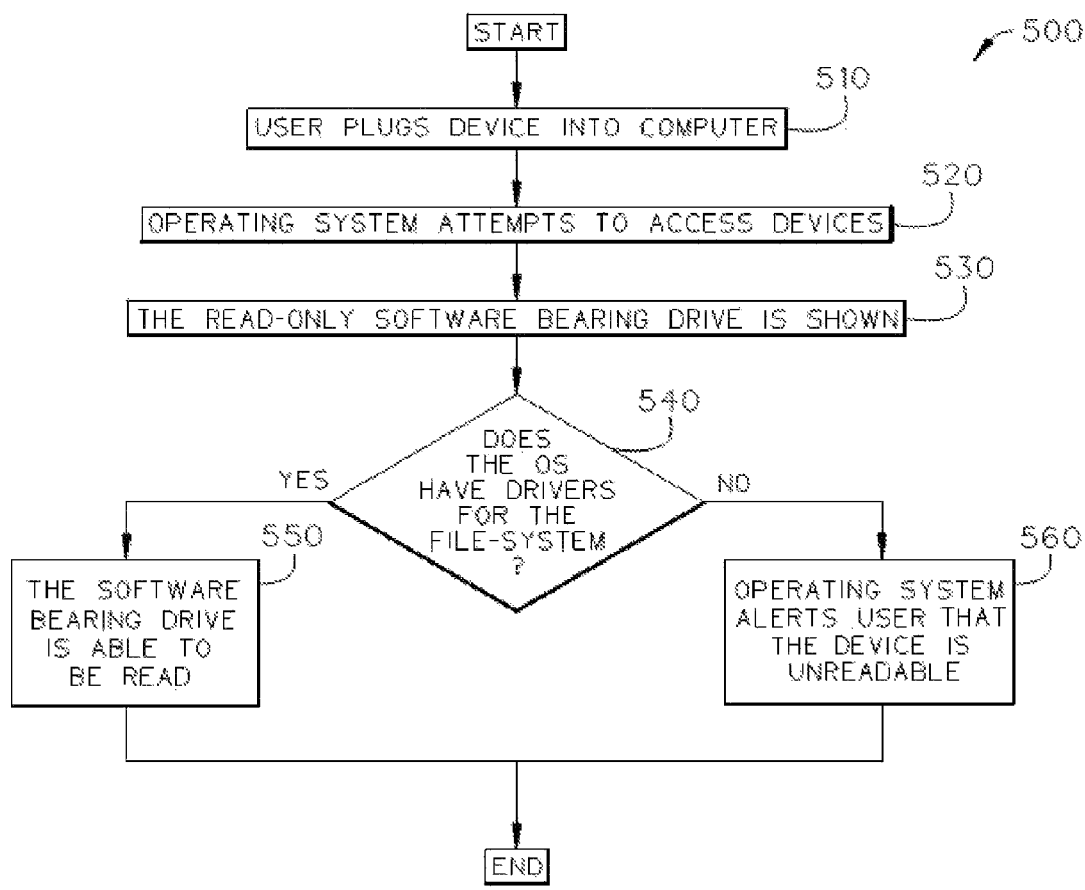
FIG. 5 conceptually illustrates a process for loading hardware driver software for a host operating system to read one or more partitions of the encrypted USB mass-storage device in some embodiments.

FIG. 5 conceptually illustrates a process 500 for loading hardware driver software for the encrypted USB mass-storage device to use a set of hardware resources of a host computer system. As shown in this figure, the process 500 begins when the user plugs the encrypted USB mass-storage device into the host computer system (at 510). For example, the user may connect the USB male connector of the encrypted USB mass-storage device to a female USB connection port of the host computer system. Next, the operating system of the host computer system attempts to access the encrypted USB mass-storage device (at 520). The process can only access the read-only software-bearing partition of the encrypted USB mass-storage device which is then presented (at 530). Only the read-only software-bearing partition is presented because unless the user boots from the encrypted USB mass-storage device when the host computer system starts in a powered-off state, then the encrypted USB mass-storage device will be accessed by the host computer operating system just as any other mass-storage device would be accessed (or rather, the host computer system will attempt to access the encrypted USB mass-storage device).

Next, the process 500 determines (at 540) whether the operating system has a set of hardware driver modules for the file system of the encrypted USB mass-storage device. If the hardware drivers are present, the process reads (at 550) the software-bearing partition of the encrypted USB mass-storage device. On the other hand, if the hardware drivers are not present, the process 500 then alerts (at 560) the user that the encrypted USB mass-storage device is unreadable. The process 500 then ends.

Many of the above-described examples relate to USB mass-storage devices. However, a person skilled in the art would understand that the invention described in this disclosure could be implemented in any type of mass-storage device, such as an encrypted Firewire mass-storage device or an encrypted Thunderbolt mass-storage device.

Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
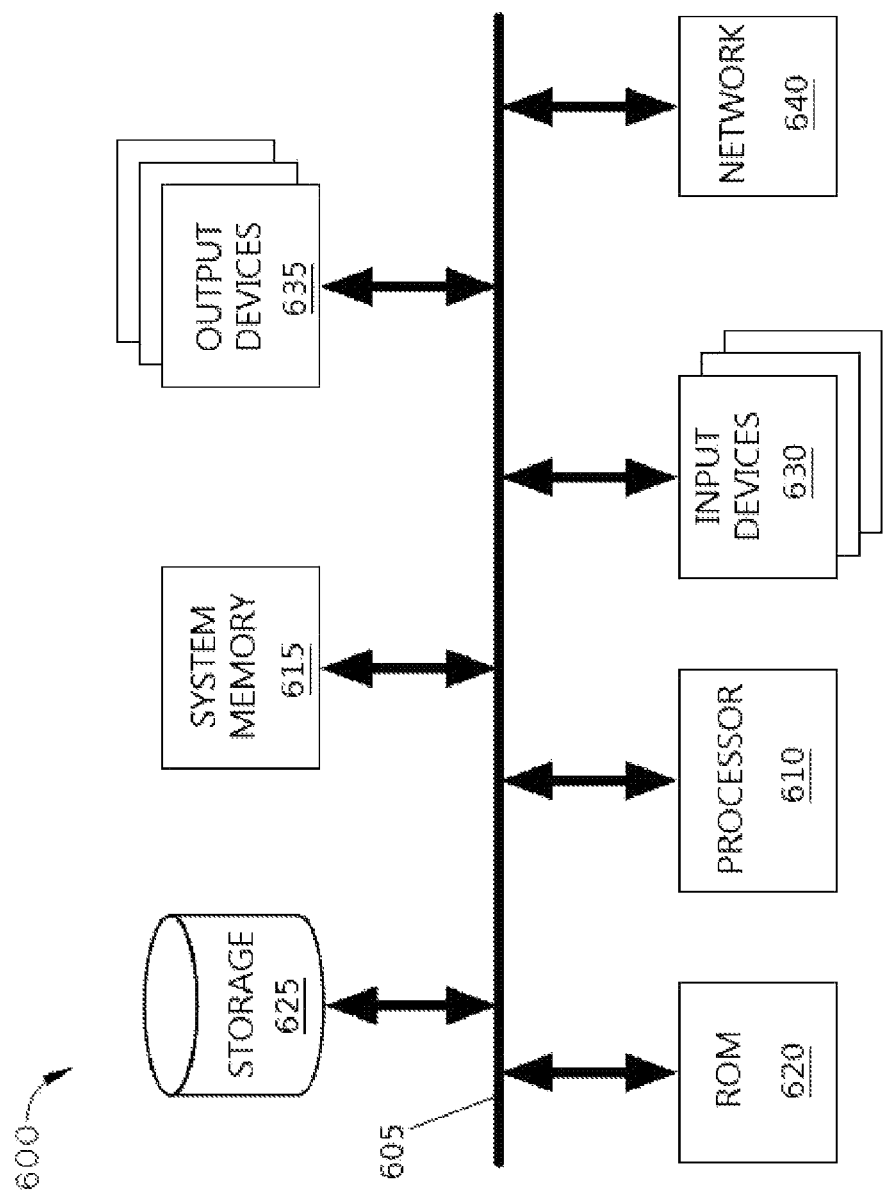
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing devices (also called "cursor control devices"). The output devices 635 display images generated by the electronic system 600. The output devices 635 include printers and display devices, such as cathode ray tubes (CRT) or liquid crystal displays (LCD). Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For example, processes are conceptually illustrated in FIGS. 4-5. The specific operations of these processes may not be performed in the exact order shown and described. Specific operations may not be performed in one continuous series of operations, and different specific operations may be performed in different embodiments. Furthermore, the processes could be implemented using several sub-processes, or as part of larger macro processes. Thus, one of ordinary skill in the art would understand that the invention is not to be limited by the foregoing illustrative details and examples, but rather is to be defined by the appended claims.

I claim:

1. A secure encrypted mass-storage drive device that stores digital data files of a user and interfaces with a host computer system by way of a universal serial bus port to access the digital data files without operation of an operating system of the host computer system, said secure encrypted mass-storage device comprising:
    a partitioned mass-storage disk drive comprising a read-only partition that is a read-only software-bearing partition and at least one encrypted file system partition comprising a set of encrypted data files that are accessible only to an authenticated user;
    a self-running operating system that is automatically loaded during power-up of the host computer system when the secure encrypted mass-storage drive device is connected to a USB port of the host computer system; and
    a set of authentication applications that are presented during power-up of the host computer system and as the self-running operating system is automatically loaded, said authentication applications presented to authenticate a username and a password of the user.

2. The secure encrypted mass-storage drive device of claim 1 further comprising an application that securely and completely deletes all information from the partitioned mass-storage disk drive when at least one of the authentication applications determines that a threshold number of failed authentication attempts have occurred.

3. The secure encrypted mass-storage drive device of claim 1, wherein the encryption of the partitioned mass-storage disk is 64-bit encryption.

4. The secure encrypted mass-storage drive device of claim 1, wherein the encryption of the partitioned mass-storage disk is 128-bit encryption.

5. The secure encrypted mass-storage drive device of claim 1, wherein the encryption of the partitioned mass-storage disk is 256-bit encryption.

6. The secure encrypted mass-storage drive device of claim 1, wherein the encryption of the partitioned mass-storage disk is 512-bit encryption.

7. The secure encrypted mass-storage drive device of claim 1, wherein the encryption of the partitioned mass-storage disk is 1024-bit encryption.

8. The secure encrypted mass-storage drive device of claim 1 further comprising a drive cap, a drive light, and a drive key ring hole.

9. The secure encrypted mass-storage drive device of claim 1, wherein the self-running operating system accesses at least one of a kernel, a set of files, and a set of tables associated with the host operating system in order to use a set of hardware devices of the host operating system.

* * * * *